Figure 1:
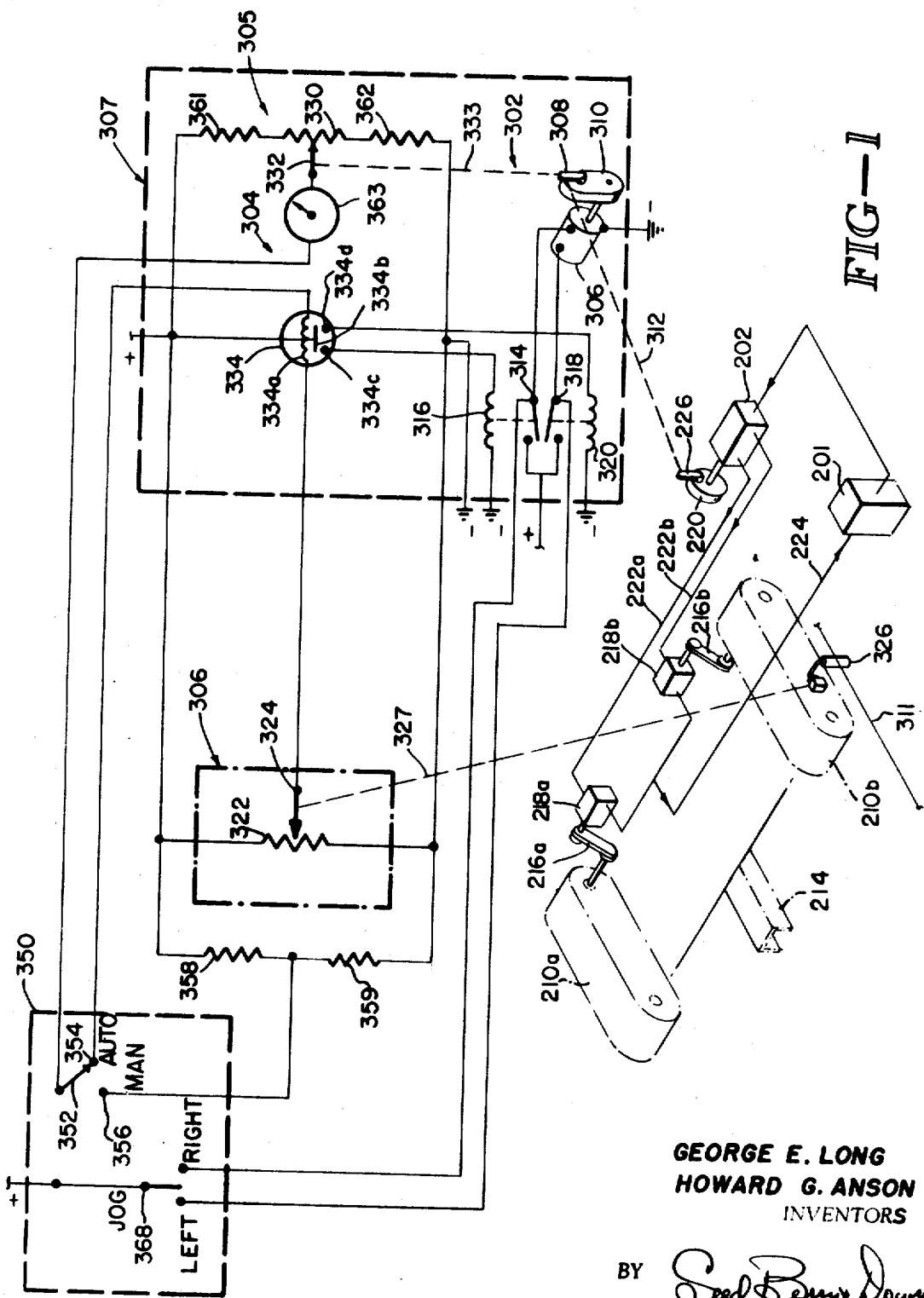

United States Patent

[11] 3,543,654

| [72] | Inventors | George E. Long<br>Rte. 2 Box 382, Monroe, 98272;<br>Howard G. Anson, 15823 35th NE, Seattle, Washington 98115 |
|---|---|---|
| [21] | Appl. No. | 834,623 |
| [22] | Filed | June 19, 1969<br>Continuation-in-part of Ser. No. 745,507, July 17, 1968, abandoned. |
| [45] | Patented | Dec. 1, 1970 |

[54] SERVO CONTROLLED HYDRAULIC SYSTEM
11 Claims, 2 Drawing Figs.

[52] U.S. Cl. .................................................. 94/46,
180/6.5
[51] Int. Cl. .................................................. E01c 19/48
[50] Field of Search ........................................ 94/46;
180/6.5

[56] References Cited
UNITED STATES PATENTS

| 2,424,288 | 7/1947 | Severly | 180/1UX |
| 2,832,426 | 4/1958 | Seargeant | 180/6.5X |
| 2,962,642 | 11/1960 | Brane | 180/6.5X |
| 3,453,939 | 7/1969 | Pollitz | 94/46 |

Primary Examiner—Jacob L. Nackenoff
Attorney—Seed, Berry and Dowrey

ABSTRACT: A servocontrol regulates the output of a variable displacement hydraulic pump circuit to a hydraulic motor responsive to changes in a predetermined relationship between a sensing input and a feedback input to a control means, the latter being adapted to control the output of an electromechanical transducer to the pump circuit. This servocontrol is particularly suited to control the propulsion system of a slip-form paving machine to maintain a desired travel direction.

GEORGE E. LONG
HOWARD G. ANSON
INVENTORS

BY

ATTORNEYS

GEORGE E. LONG
HOWARD G. ANSON
INVENTOR.

BY Seed Berry Dowey

ATTORNEYS ll
3,543,654

SERVO CONTROLLED HYDRAULIC SYSTEM

This application is a continuation-in-part of a pending U.S. Pat. application entitled "Servo-Controlled Hydraulic System", Ser. No. 745,507, filed July 17, 1968 now abandoned.

This invention relates to systems wherein a prime mover drives a vehicle conveyor system through a closed circuit hydraulic pump, a flow divider or combiner valve, and a pair of motors, the hydraulic pump input being coupled to the prime mover and the hydraulic motor outputs being coupled to the vehicle conveying system. More particularly, this invention relates to such a system including a servocontrol provided to continuously sense the travel direction of the vehicle and to regulate the hydraulic circuit according to variations in a predetermined relationship within the servocontrol to maintain a desired travel direction.

The FIG. depicts one embodiment of the invention as applied to a slip-form paving machine to control the travel direction of the machine by regulating the respective travel rates of the two track conveyors.

The present invention comprises a servocontrol coupled to a hydraulic pump and motor circuit and includes electromechanical transducer means coupled to the hydraulic pump circuit to regulate the output therefrom to a pair of motors so as to maintain a desired motor output, sensing transducer means for continuously sensing a variable function responsive to the electromechanical transducer means output, and control means and an output coupled to the electromechanical transducer means. The control means is adapted to control the output of the electromechanical transducer means responsive to changes in a predetermined relationship between the inputs to the control means, thus to proportion the hydraulic pump output to the motors.

Depending upon the nature of the variable function of the environment system to be velocity sensitive, elevation sensitive, pressure sensitive, temperature sensitive, rate sensitive, directional sensitive or the like. The signal output from the sensing transducer means may be voltage oriented or current oriented, depending upon whether the control means is voltage sensitive or current sensitive. The control means may be preset to effect the hydraulic circuit motor output necessary to provide a required velocity, elevation, pressure, volume, or the like within the environment system.

In one embodiment of the invention, the electromechanical transducer means comprises a reversible electric motor mechanically linked to a variable output flow divider or combiner valve in the output from the hydraulic circuit pump through a high reduction drive train. The control means comprises a current sensitive circuit that actuates the reversible electric motor, depending upon the electric motor output required, responsive to the input sensing and feedback signals. The current sensitive circuit preferably includes a balanced-coil device that is unbalanced by input sensing signals to complete either a "forward" or "reverse" electric motor circuit depending upon the relation of the input sensing signals to the operating parameters of the control means, and this is rebalanced by input feedback signals to open the electric motor circuit previously completed. The balanced-coil device may be of the type that is actuated to complete an electric motor circuit by current direction or of the type that is actuated by a selected one of multiple currents.

In another embodiment of the invention, the electromechanical transducer means comprises an electric stepper motor mechanically linked to a variable output flow divider or combiner valve in the output from the hydraulic circuit pump. The control means comprises a comparator circuit that actuates the stepper motor responsive to the input sensing and feedback signals.

Figure 2:
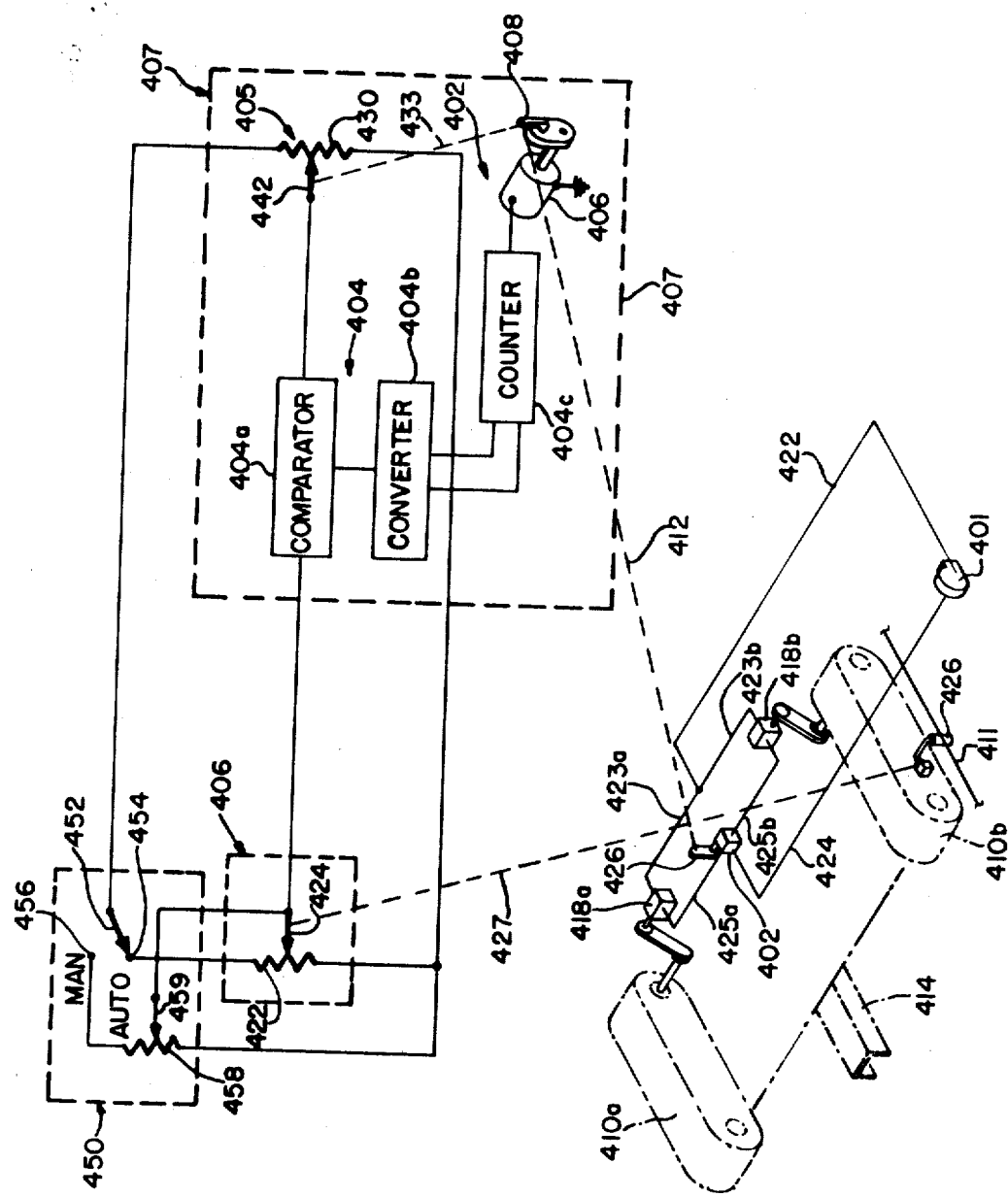

FIG. 1 depicts an exemplary embodiment of the invention utilizing a balanced coil control circuit to operate a reversible electric motor, in conjunction with a slip-form paving machine; and FIG. 2 depicts another embodiment, utilizing a solid-state comparator circuit to operate a stepper motor, in conjunction with a slip-form paver.

With reference to FIG. 1, the environment system depicted—namely, a slip-form paving machine—comprises a pair of endless drive tracks 210a and 210b, each separately driven by the output of an independent hydraulic motor 218a and 218b. An elongated slip form 214 is mounted between the tracks to lay down material from a hopper (not shown) located forwardly (with respect to the direction of travel of the machine along the roadway).

In the past, no satisfactory manner of travel direction control has been employed to maintain the slip-form paver travel along a straight path. Consequently, as the machine operator manually corrected the machine's travel path, overcorrection inevitably would be made causing the slip form to slew to one side to such an extent that a break in the just-layed material would result.

Returning to FIG. 1, both tracks 210a and 210b are mechanically driven by separate chain drive and gear reducer assemblies 216a and 216b from the output shaft of two independent variable displacement hydraulic motors 218a and 218b. The hydraulic motors 218a and 218b are driven by a variable displacement hydraulic pump 201 which, together with the interconnecting high- and low-pressure hydraulic circuit. The volumetric output of the pump 201 is externally controllable by a volumetric output control such as a pump swashplate-adjusting control lever. The flow divider valve 202 is externally controllable by a valve-adjusting control lever 226.

The position of the valve-adjusting control lever 226, and hence the volumetric output from the pump 202 to the motors 218a and 218b, is regulated by a servocontrol mechanism which comprises an electromechanical transducer means 302, control means 304, a sensing transducer means 306, and a feedback transducer means 305. The means 302, 304 and 305 are preferably encased as an actuator unit 307 with electrical power inputs and the lever 308 mounted externally of the encasing.

The electromechanical transducer means 302 comprises a reversible electric motor 306, the output of which is connected to an actuating lever 308 through a high reduction drive train 310. The lever 308 is operably connected to the valve-adjusting control lever 226 by means such as a mechanical linkage 312. The motor 306 is direct current operated either in the "forward" direction or in the "reverse" direction through separate circuit paths controlled by the circuitry of the control means 304. The "forward" d.c. circuit path includes a normally open relay switch 318 in series with the motor and a d.c. power source and operated by relay 320 in the circuit of the control means 304. Thus, the motor 306 is operated only when one or the other of the switches 314 or 318 is closed to complete a closed circuit by operation of the control means 304.

A sensing transducer means 306 comprises a variable resistance 322 in series with a d.c. power source having a variable tap 324 remotely positionable by a sensor paddle 326 through a suitable linkage mechanism 327. Sensor paddle 326 is pivotally mounted with its paddle end extending downwardly to contact a guide wire 311 such that the relative position of the variable tap 324 is directly proportional to the travel position of the paving machine.

The feedback transducer means comprises a variable resistance 330 having a variable tap 332 remotely positionable by the motor actuating lever 308 through a suitable linkage mechanism 333. The interconnecting linkage is such that the relative position of the variable tap 332 is directly proportional to the position of the actuating lever 308.

The control means 304 circuit comprises a resistance bridge, one parallel leg of which constitutes variable resistance 322 and a pad of fixed resistance 358—359 in parallel with resistance 322, and the other parallel leg of which constitutes a variable resistance 330 and a pad of fixed resistances 361—362 in series with resistance 330, a twin output of the balanced-coil device 334. The balanced-coil device 334 is a sensitive current-directional relay, an example of which is a single coil micropositioner AYLZ manufactured by Barber-Colman, with a coil 334a connected to the variable resistance taps 324—332 and statically balanced contact arm 334b connected to one terminal of a d.c. power source and two outputs 334c and 334d contactable by the contact arm. The meter 363 is connected in series with the variable resistance tap 332 and the coil 334a.

The relay circuit of the balanced-coil device 334 is completed through the paving machine operator's control panel 350. The circuitry of the control panel 350 includes a multiposition manually operable control switch 352, the base of which is connected to the balanced-coil device as shown. The switch contacts include an "automatic" position 354 connected to the variable tap 324 and a "manual" position 356 connected to the center point between the pad of fixed resistances 358—359. The control panel 350 also mounts a manually operable two-position toggle switch 368, the two contacts of which are connected into the motor circuit to shunt the two relay switches 314—318.

During operation of the paving machine, the servocontrol of this invention functions as follows when the control switch is set on "automatic".

As the paving machine is propelled forwardly, the direction of the machine relative to wire 311 is sensed by the sensor paddle 326 which thereby positions the variable tap 324 of variable resistance 322 and establishes a voltage potential at that input to the relay of the balanced-coil device 334. If the variable tap 332 of variable resistance 330 is positioned such that the voltage potential at the opposite input to the relay of the balanced-coil device 334 is equal the voltage potential on the opposite side of the resistance bridge, where will be no current through the balanced-coil device 334. Thus, motor 306 will not be actuated, the valve-adjusting control lever 226 will remain in a set position such that the output of the motor 306 will remain constant and the tracks 210a and 210b will continue to be driven at an unchanged rate.

If, however, the voltage potentials at the inputs to the relay of the balanced-coil device 334 are not balanced, a current will be created through the balanced-coil device 334 in a direction dependent upon whether the travel direction, as sensed by the sensor paddle 326, is off line. Depending on the current direction through the relay of the balanced-coil device 334, the balanced-contact arm 334b, will close on one or the other of the two outputs 334c or 334d from the balanced-coil device 334 and actuate one or the other of the relays 316 or 320 to close one or the other of the relay switches 314 or 318, and thereby activate the motor 306 in the "forward" or "reverse" direction. Upon actuation of the motor 306, the actuating lever 308 and, concomitantly, the valve-adjusting control lever 226 will be rotated in the selected direction to vary the volumetric proportion output of valve 202 to effect a concomitant directional change of the machine. The actuating lever 308 will rotate in the selected direction until the variable resistance tap 332, coupled thereto, is repositioned to balance the voltage potentials across the balanced-coil device 334. When the voltage potentials thereacross are rebalanced, the relay of the balanced-coil device 334 will open, deactivating the previously activated relay 316 or 320 and opening the respective switch 314 or 318 and deactivating the motor 306. The resultant output of the motor 306 will thereafter remain constant until the sensed input signal to the balanced-coil device again creates an unbalanced condition necessitating a change in the output of motor 306.

Thus, when the sensing input signal and the feedback input signal are balanced, the balanced-coil device 334 is inactive. When these input signals are not balanced, a rebalanced condition occurs by varying the input signals until they do balance. By this arrangement, the sensed travel direction can be maintained along the desired path within a fraction of an inch without making the necessity of effecting drastic changes in the track speed rates.

If manual, nonservocontrol of the paving machine is desired, the panel control switch is switched to the "jog" position thereby disconnecting the control means to the extent that toggle switch 368 may operate the motor 306 and control the hydraulic circuit without automatic feedback control. In this regard, the resistance pads 358—359 and 361—362 are appropriately selected such that the meter reading of meter 363 will indicate travel direction variations from "straight ahead" as sensed by sensor paddle 326. Resistance pads 361—362 may be replaceable such that the meter multiplication ratio of the sensor may be changed to any desired ratio.

With reference to FIG. 2, the pair of endless drive tracks 410a and 410b are each separately driven by the output of an independent hydraulic motor 418a and 418b, the elongated slip form 414 being mounted between the tracks. The hydraulic motors 418a and 418b are driven by hydraulic pump 401 which, together with the interconnecting high- and low-pressure hydraulic fluid transfer lines 422, 423a, 423b, 424, 425a and a variable flow combiner valve 402 constitute a closed-loop hydraulic circuit. The volumetric output of pumps 401 may be externally adjustable by a volumetric output control such as a pump swashplate-adjusting control lever. The flow combiner valve 402 is externally adjustable by a valve-adjusting adjusting control lever 426.

The position of the valve-adjusting control lever 426, and hence the volumetric output from pump 402 to motors 418a and 418b, is regulated by a servocontrol mechanism which comprises an electromechanical transducer means 402, a sensing transducer means 406, and a feedback transducer means 405. The means 402, 404 and 405 are preferably encased as an actuator unit 407 with electrical power inputs and the lever 408 mounted externally of the encasing.

The electromechanical transducer means 402 comprises an electric stepper motor 406, the output of which is connected to lever 408. Lever 408 is operably coupled to the valve-adjusting control lever 426 by means such as mechanical linkage 412. The output from motor 406 is designed to rotate through a precisely defined arc for each input pulse transmitted to the motor.

The sensing transducer means 406 comprises a variable resistance 422 in series with a d.c. power source having a variable tap 424 remotely positionable by a sensor paddle 426 through a suitable linkage mechanism 426. Sensor paddle 426 is pivotally mounted with its paddle end extending downwardly to contact a guide wire 411 such that the relative position of the variable tap 424 is directly proportional to the travel position of the paving machine.

The feedback transducer means comprises a variable resistance 430 having a variable tap 442 remotely positionable by the motor-actuating lever 408 through a suitable linkage mechanism 433. The interconnecting linkage is such that the relative position of the variable tap 432 is directly proportional to the position of the actuating lever 408.

The control means 404 comprises a comparator circuit 404a that compares the relative valves of tapped resistance 422 and 430 and transmits an error signal indicating both polarity and magnitude to a voltage-to-frequency converter circuit 404b. Circuit 404b converts this input to a polarity signal and a frequency signal which are transmitted to a ring counter circuit pulse circuit 404c. The pulse output from circuit 404c causes the stepper motor 406 output to rotate through a precise arc depending upon the pulse output. In this control circuit 404, the rate of change in the stepper motor output is frequency dependent and the direction of change is polarity dependent.

The comparator circuit 404 is completed through the paving machine operator's control panel 450. The circuitry of the panel 450 includes a multiposition manually operable control switch 452, the base of which is connected as shown. The switch contacts include an "automatic" position 454 connected to resistance 422, and a "manual" position 456 connected to variable resistance 458, the latter and its center tap 459 being connected in parallel to resistance 422.

During operation of the paving machine in the "automatic" mode, the sensed position of the machine relative to wire 411 will establish a voltage at the sensing input to the comparator circuit 404a for comparison with the feedback input. If the inputs are balanced, no output will be transmitted to circuit 404b. If the inputs are unbalanced, a signal of appropriate magnitude and polarity will be transmitted to effect a change in the position of the valve-actuating control lever 426. Upon actuation of the motor 406, the actuating lever 408 and, concomitantly the valve adjusting control lever 426 will be rotated in the selected direction to vary the volumetric flow between the motors 418a and 418b to effect a concomitant directional change in the machine to that dictated by the stepper motor output.

If manual, nonautomatic, control of the paving machine is desired, the panel control switch is switched to "manual" thereby substituting manually adjustable variable resistance 458 for the variable sensor resistance 422. As resistance 458 is manually varied, the control circuit 404 will function as above-described to effect the appropriate change in the valve-actuating control lever 426.

In either of the embodiments described, the hydraulic motor flow proportioning valve, 202 or 402, may be provided as a divider valve per FIG. 1 or a combiner valve per FIG. 2. In many instances, the use of a combiner valve will reduce cavitation problems and thereby increase the accuracy of control.

The embodiments depicted may be suitably modified to provide directional control for a variety of vehicles having independently driven wheels. For example, in the case of crop-cultivating vehicles, the direction sensor could employ a track wheel assembly designed to ride in a crop furrow such that the vehicle will maintain a travel direction parallel to the sensed furrow direction.

It is believed that the invention will have been clearly understood from the foregoing detailed description of our now-preferred illustrated embodiment. Changes in the details of construction may be resorted to without departing from the spirit of the invention and it is accordingly our intention that no limitations be implied and that the hereto annexed claims be given the broadest interpretation to which the employed language fairly admits.

We claim:

1. In a vehicle direction control system comprising a hydraulic circuit including a variable output hydraulic pump, a pair of hydraulic motors driven by said pump and a variable flow proportioning valve: the combination therewith of a servocontrol which comprises electromechanical transducer means coupled to said valve to regulate flow proportions so as to maintain desired motor outputs; sensing transducer means continuously sensing the vehicle direction of travel and providing an electrical output signal responsive thereto; feedback transducer means continuously sensing a function variable responsive to the output of said electromechanical transducer means; and control means having a sensing input coupled to said sensing transducer means a feedback input coupled to said electromechanical transducer means, said control means being adapted to control the output of said electromechanical transducer means, said control means being adapted to control the output of said electromechanical transducer means to said valve circuit responsive to the inputs of said control means.

2. The system of claim 1 wherein said control means includes a normally open current-sensitive balanced-coil device adapted to be actuated to complete an electrical circuit to actuate said electromechanical transducer means when an imbalance exists between the sensing input and feedback input signals to said control means.

3. The system of claim 2 wherein said electromechanical transducer means includes a reversible electric motor and actuating means coupling the output of said motor to said valve, and wherein actuation of said balanced-coil device completes either a forward or a reverse motor circuit depending upon the relation of said sensing input signal to the operating parameters of said control means.

4. The system of claim 2 wherein said sensing transducer means includes a variable resistance means constituting one leg of a bridge circuit bridged by said balanced-coil device; and wherein said feedback transducer means includes a variable resistance means constituting another leg of said bridge circuit and including a variable tap thereof linked to said electromechanical transducer means to provide a feedback input circuit path to said balanced-coil device.

5. The system of claim 1 wherein said sensing transducer means includes a sensor adapted to continuously sense the vehicle travel direction; and wherein said hydraulic motors are adapted to be drivingly coupled to the vehicle such that the proportional output of said motors can be regulated by said servocontrol to maintain a predetermined travel direction.

6. The system of claim 1 wherein said electromechanical transducer means comprises a reversible electric motor, actuating means coupling the output of said motor to said valve and an electrical network including normally open relay switch means interconnecting the motor input to a power source; wherein said sensing transducer means includes a variable resistance having a variable tap positionable proportionately to the changes in the sensed variable function; wherein said feedback transducer means includes a variable resistance having a variable tap positionable proportionately to changes in position of the motor actuating means; and wherein said control means includes a resistance bridge circuit wherein the sensing transducer means variable resistance and the feedback transducer means variable resistance constitute opposite leg of such bridge circuit, and includes a balanced-coil device bridging said bridge circuit and having a sensing input coupled to the variable tap of the feedback transducer means variable resistance and having an output coupled to said relay switch means, said balanced-coil device being in a nonconducting condition when its inputs are balanced and being in a conducting condition to actuate said relay switch means when its inputs are unbalanced.

7. A slip form paving system which comprises a pair of vehicle conveyor means; a slip form mounted between said conveyor means and adapted to receive paving material therefrom and distribute such paving material longitudinally of the vehicle; a prime mover for said system; a hydraulic conveyor-driving circuit comprising a variable output hydraulic pump having a power input coupled to said prime mover, a pair of hydraulic motors hydraulically coupled to said hydraulic pump in a closed circuit and having independent power outputs, drive means independently and drivingly coupling each hydraulic motor power output to a separate conveyor means, and a variable flow proportioning valve hydraulically coupled between the pump and the motors; and conveyor speed control means including a servocontrol which comprises electromechanical transducer means coupled to said valve to proportion the volumetric flow between the two motors so as to maintain desired hydraulic motor outputs, sensing transducer means continuously sensing the direction of travel of said vehicle and providing an electrical output signal responsive thereto, feedback transducer means continuously sensing the output of said electromechanical transducer means, and control means having a sensing input coupled to said sensing transducer means and a feedback input coupled to said feedback transducer means and an output coupled to said electromechanical transducer means, said control means being adapted to control the output of said electromechanical transducer means to said valve responsive to the inputs to said control means.

8. The system of claim 7 wherein said control means includes a normally open current-sensitive balanced-coil device adapted to be actuated to complete an electrical circuit to actuate said electromechanical transducer means when an imbalance exists between the sensing input and feedback input signals to said control means.

9 The system of claim 8 wherein said electromechanical transducer means includes a reversible electric motor and actuating means coupling the output of said motor to said valve and wherein actuation of said balanced-coil device completes either a forward or a reverse motor circuit depending upon the relation of said sensing input signal to the operating parameters of said control means.

10. The system of claim 8 wherein said sensing transducer means includes a variable resistance means constituting one leg of a bridge circuit bridged by said balanced-coil device; and wherein said feedback transducer means includes a variable resistance means constituting another leg of said bridge circuit and including a variable tap thereof linked to said electromechanical transducer means to provide a feedback input circuit path to said balanced-coil device.

11. The system of claim 7 wherein said electromechanical transducer means comprises a reversible electric motor, actuating means coupling the output of said motor to said valve, and an electrical network including normally open relay switch means interconnecting the motor input to a power source; wherein said sensing transducer means includes a variable resistance having a variable tap positionable proportionately to the changes in the sensed variable function; wherein said feedback transducer means includes a variable resistance having a variable tap positionable proportionately to changes in position of the motor actuating means; and wherein said control means includes a resistance bridge circuit wherein the sensing transducer means variable resistance and the feedback transducer means variable resistance constitute opposite legs of such bridge circuit, and includes a balanced-coil device bridging said bridge circuit and having a sensing input coupled to the variable tap of the feedback transducer means variable resistance and having an output coupled to said relay switch means, said balanced-coil device being in a nonconducting condition when its inputs are balanced and being in a conducting condition to actuate said relay switch means when its inputs are unbalanced.

UNITED STATES PATENT OFFICE
CERTIFICATE OF CORRECTION

Patent No. 3,543,654                           Dated December 1, 1970

Inventor(s) George E. Long et al

It is certified that error appears in the above-identified patent and that said Letters Patent are hereby corrected as shown below:

In the Figure of the drawing on the cover page of the patent change reference numeral "306" shown in the center of the Figure to -- 303 --. Also make this same change to Figure 1 of sheet 1 of the drawing. In the drawing, sheet 2, Figure 2, change reference numeral "406" in the center of the Figure to -- 403 --. In the lefthand column of the cover page of the patent under item [22], after "July 17, 1968" delete ",abandoned."

In the specification, column 1, lines 4 and 5 delete "now abandoned".

Column 2, line 22, after "hydraulic" insert -- lines 222a, 222b, 224 and the flow divider valve 202, constitute a closed hydraulic --; line 28, change "202" to -- 201 --; line 31, change "306" to -- 303 --; line 51, change "306" to -- 303 --; line 61, delete "motor"; line 70, after the "," insert -- and --.

Column 3, line 29, change "where" to -- there --; lines 32 and 33, change "motor 306" to -- motors 218a and 218b --; line 71, change "jog" to -- manual --.

Column 4, line 14, after "425a" insert --, 425b --; line 22, change "402" to -- 401 --; line 25, change "406" to -- 403 --; line 37, change "406" to -- 403 --; line 40, change "426" to -- 427 --; line 47, delete "motor-"; line 49, change "432" to -- 442 --; line 52, change "valves" to -- values --.

Column 5, line 53, after "transducer means" insert -- and --; lines 54-56 delete "said control means being adapted to control the output of said electromechanical transducer means,"; line 58, delete "circuit".

UNITED STATES PATENT OFFICE
CERTIFICATE OF CORRECTION

Patent No. 3,543,654          Dated December 1, 1970

Inventor(s) George E. Long et al

It is certified that error appears in the above-identified patent and that said Letters Patent are hereby corrected as shown below:

Column 6, line 25, delete "motor"; line 26, after "circuit" insert -- , --; line 29, change "leg" to -- legs --; line 31, after "the" (second occurance) insert -- sensing transducer means variable resistance and a feedback input coupled to the variable tap of the --.

Column 8, line 5, delete "motor"; line 6, after "circuit" insert -- , --; line 11, after "the" (second occurance) insert -- sensing transducer means variable resistance and a feedback input coupled to the variable tap of the --.

Signed and sealed this 17th day of August 1971.

(SEAL)
Attest:

EDWARD M. FLETCHER, JR.
Attesting Officer

WILLIAM E. SCHUYLER, JR.
Commissioner of Patents